United States Patent
Ajima

(10) Patent No.: US 6,385,540 B1
(45) Date of Patent: May 7, 2002

(54) METHOD FOR DETECTING ROAD POSITION OF CAR IN MULTIFORMATION ROAD

(75) Inventor: Takumi Ajima, Kanagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/623,794

(22) PCT Filed: Jan. 13, 2000

(86) PCT No.: PCT/JP00/00131

§ 371 Date: Sep. 8, 2000

§ 102(e) Date: Sep. 8, 2000

(87) PCT Pub. No.: WO00/42386

PCT Pub. Date: Jul. 20, 2000

(30) Foreign Application Priority Data

Jan. 13, 1999 (JP) .............................. 11-006811

(51) Int. Cl.$^7$ .................. G01C 21/00; G01S 11/00;
G06F 3/00; G06F 7/00; G06F 9/00; G06F 12/00;
G06F 13/00; G06F 15/00; G06F 17/00;
G06F 19/00; G06F 165/00

(52) U.S. Cl. ............... 701/213; 701/200-212;
701/214; 701/215; 701/220; 701/221; 73/178 R;
340/988; 340/990; 340/995; 434/38; 434/43;
348/118; 348/123

(58) Field of Search ............... 701/213, 200–215,
701/220, 221; 73/178 R; 340/988, 990,
995; 434/38, 43; 348/123, 118

(56) References Cited

U.S. PATENT DOCUMENTS

6,115,668 A * 9/2000 Kaneko et al. ............. 701/207
6,175,802 B1 * 1/2001 Okude et al. ............... 701/208

FOREIGN PATENT DOCUMENTS

| JP | 6-331377 | * 6/1994 |
| JP | 408201083 A | * 8/1996 |
| JP | 10141968 A | * 11/1996 |

* cited by examiner

Primary Examiner—William A. Cuchlinski, Jr.
Assistant Examiner—Ronnie Mancho
(74) Attorney, Agent, or Firm—Connolly Bove Lodge & Hutz LLP

(57) ABSTRACT

The present invention provides a method for identifying a position of a vehicle on a multi-layer road, by which it is possible to judge whether the vehicle is running on an upper layer or a lower layer of the multilayer road without using additional new devices or parts on a navigation system. In order to identify a position of a vehicle on a road when the vehicle is running on a multi-layer road, prediction can be made to some extent by determining the visible range to see GPS satellite in the sky is wide or narrow. With the purpose of processing the problem quantitatively, a position measuring ratio is defined as follows: Position measuring ratio (%)=(Traveled distance where GPS position measuring is effective)×100/(Traveled distance). By this position measuring ratio, it is possible to identify the position of the vehicle on the road.

6 Claims, 8 Drawing Sheets

VEHICLE A

VEHICLE B

VEHICLE C

VEHICLE C
(INTERSECTION)

METHOD FOR DETECTING ROAD POSITION OF CAR IN MULTIFORMATION ROAD

TECHNICAL FIELD

The present invention relates a method for identifying a position of a vehicle on a road using GPS (Global Positioning System), and in particular, to a method for detecting or identifying a position of a vehicle on a multi-layer road and for finding at which layer of a multi-layer road the vehicle (such as a vehicle driven by a user) is positioned.

BACKGROUND ART

As a tool for identifying or detecting a position of a vehicle by a user, various types of navigation system are known. FIG. 6 is a block diagram showing general features of a navigation system as known in the past. The navigation system shown in FIG. 6 comprises a GPS satellite 28, vehicle position calculating means 20 for calculating a position of a vehicle based on data from the GPS satellite 28, information retrieval means 23 for retrieving data such as a facility to be utilized, route searching means 21 for searching a route up to the facility, guiding means 22 for guiding the vehicle along the searched route, display control means 25 for displaying data on display means 26 such as liquid crystal display unit or CRT display, and a map data 27 stored in a storage medium such as CD-ROM.

Now, description will be given on measurement of the position of the vehicle based on the information from GPS satellite referring to FIG. 7 and FIG. 8. FIG. 7 shows an example, in which three GPS satellites in the sky can be seen from the vehicle. If this is represented in the sky chart shown in FIG. 8, the GPS satellites are seen at three different bearings or azimuths with respect to the advancing direction of the vehicle, and correct position measurement can be achieved in this case. Specifically, using azimuth of the vehicle and azimuth of the road, a correct road is identified by map matching. If the GPS satellites are under this condition, it is possible to correctly identify the position of the vehicle and the road where the vehicle is running.

However, when the vehicle is running on a road, which comprises two or more parallel roads constructed in multiple layers, it is difficult for a conventional type navigation system to identify the position on the road.

That is, on a road, which comprises two or more parallel roads and is constructed in multiple layers, there are an upper layer and a lower layer. Because the position of the vehicle projected on horizontal plane is the same, it is difficult to correctly identify on which of these layers the vehicle is located. As a result, when the user utilizes a highway map (a map for city expressway), audio guidance, or emergency information system, complete reliability is not always assured.

To solve the problems, it has been proposed to provide a gyro, which can detect pitching of the vehicle (whether it is ascending or descending in advancing direction). In this case, it is detected whether the vehicle has gone up on an ascending slope to enter a road on an elevated highway or has gone down on a descending slope to leave the elevated road, and it is judged whether the vehicle is running on a road (upper layer) constructed on the elevated highway, or it is running on a planar road (lower layer) under the elevated road. However, in order to accomplish this concept, it is necessary to install a new gyro, and this means higher cost for the navigation system.

To solve the above problems, it is an object of the present invention to provide a method for identifying a position of a vehicle on a multi-layer road, by which it is possible to identify whether the vehicle is running on upper layer or lower layer of the multi-layer road without using additional new devices or parts on the navigation system.

According to one aspect of the present invention, there is provided a method for identifying a position of a vehicle on a multi-layer road to identify whether the vehicle running on one of the layers of the multi-layer road is running on the uppermost layer or on a lower layer under the uppermost layer of the multi-layer road, whereby, in case the ratio of a distance in a section where GPS position measurement can be achieved in a predetermined traveling distance is equal to or higher than a predetermined threshold for identification of the upper layer, it is judged that the vehicle is running on the upper layer (the uppermost layer), and if the ratio is lower than the other predetermined threshold for identification of lower layer, it is judged that the vehicle is running on the lower layer (a layer under the uppermost layer). Thus, it is possible to provide effects to identify whether the vehicle is on the upper layer or the lower layer of the multi-layer road without using additional new devices or parts on the navigation system.

In the present specification, the term "upper layer" means the uppermost layer as described above, and the term "lower layer" means a layer under the uppermost layer. That is, in case of 3-layer structure, the uppermost layer is the upper layer, and each of two layers under the uppermost layer is the lower layer.

According to another aspect of the present invention, there is provided a method for identifying a position of a vehicle on a multi-layer road to identify whether the vehicle running on one of the layers of the multi-layer road is running on the uppermost layer or on a lower layer under the uppermost layer of the multi-layer road, whereby, in case the section where GPS position measurement can be achieved in the predetermined traveling distance is discrete, it is identified as the lower layer, and it is possible to identify the lower layer of the multi-layer road without using additional new devices and parts on the navigation system.

According to still another aspect of the present invention, there is provided a method for identifying a position of a vehicle on a multi-layer road to identify whether the vehicle running on one of the layers of the multi-layer road is running on the uppermost layer or on a lower layer under the uppermost layer of the multi-layer road, whereby, if satellites at left and right are equally seen with respect to the advancing direction of the vehicle, it is identified as the upper layer, and if not, it is judged as the lower layer. Thus, it is possible to provide effects to identify the upper layer or the lower layer of the multi-layer road without using additional new devices or parts on the navigation system.

According to still another aspect of the present invention, there is provided a method for identifying a position of a vehicle on a multi-layer road to identify whether the vehicle running on one of the layers of the multi-layer road is running on the uppermost layer or on a lower layer under the uppermost layer of the multi-layer road, whereby, if a satellite above a lane in opposite direction with respect to the advancing direction of the vehicle is seen, it is judged as the upper layer, and if not, it is judged as the lower layer. Thus, it is possible to provide effects to identify the upper layer or the lower layer of the multi-layer road without using additional new devices or parts on the navigation system.

According to yet another aspect of the present invention, a method for identifying a position of a vehicle as described above can be provided, wherein if the level of receiving signal from a satellite above a lane in opposite direction with respect to the advancing direction of the vehicle is lower than the level of receiving signals from a satellite in reverse direction to the lane in opposite direction, it is judged the vehicle is running on an apparent upper layer and not on a true upper layer and there are provided effects that an apparent upper layer identified erroneously because of reflection from a building or the like is not identified as a true upper layer.

BEST MODE FOR CARRYING OUT THE INVENTION

Figure 1:
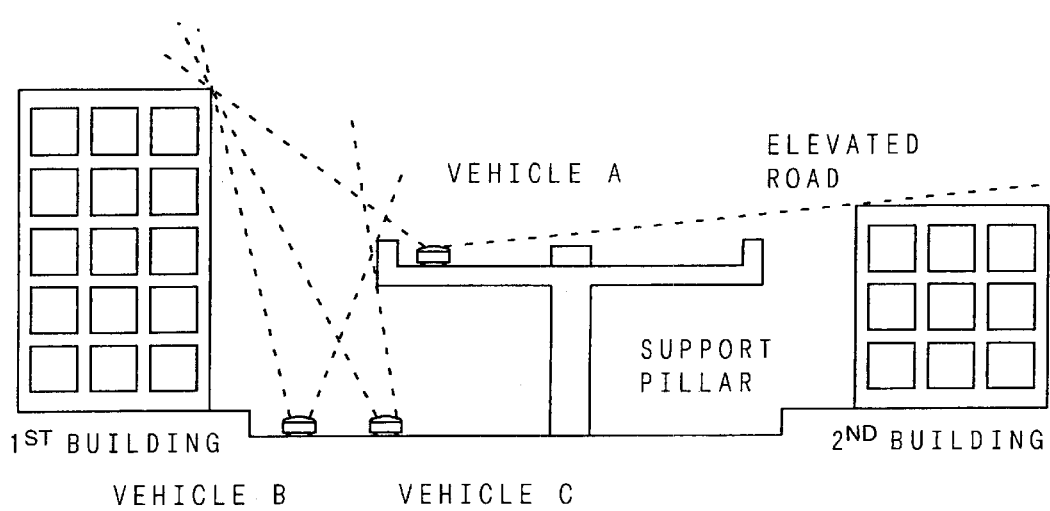
FIG. 1 is a drawing to explain an embodiment of a method for identifying a position of a vehicle on a multi-layer road according to the present invention.

Description will be given below on embodiments of the present invention referring to the drawings. FIG. 1 is a drawing to explain a method for identifying or detecting a position of a vehicle on a multi-layer road in an embodiment of the present invention. In FIG. 1, a vehicle A is shown as a vehicle running on a road constructed on an elevated highway. Also, a vehicle B and a vehicle C are shown as vehicles running on a road under the elevated highway. It is assumed that a first building and a second building higher than the elevated road are constructed each on one side of the road. Each of the vehicles is provided with a navigation system, by which a position information can be calculated using GPS satellite. For the vehicle A running on a road on the upper layer, there is no obstacle, which hinders the receiving of information from GPS satellite on the sky except a part of the first building. However, for the vehicle B, although there is no obstacle to hinder the receiving of information from the sky ahead of the vehicle, it is not possible to see the sky in leftward and rightward directions from the vehicle because it is hindered by the first building and the elevated road. For the vehicle C, the sky cannot be seen in leftward and rightward directions except a part in forward direction.

Figure 2A:
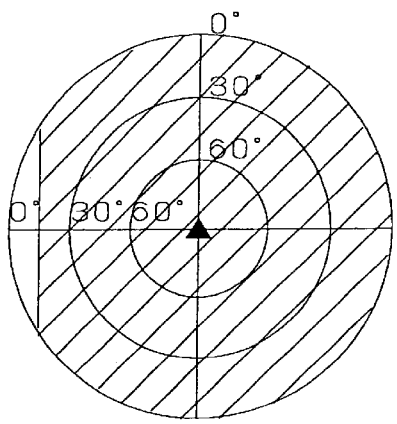
FIG. 2A to FIG. 2D each represents a drawing to show that the range where GPS satellite can be seen differs according to a position of a vehicle on a multi-layer road in the detection procedure of the present invention.

These conditions can be seen in the sky charts shown in FIG. 2A to FIG. 2D. A vehicle shown by a mark ▼ is positioned at the center of the sky chart and it is assumed that advancing direction of the vehicle is directed from the bottom to the top of each chart. Unless otherwise specified hereinafter, it is assumed that each of the vehicles is running on left side on the road to facilitate the explanation. For the vehicle A, visual field of the driver is hindered slightly by the first building as shown in FIG. 2A, but it is possible to see all other parts of the sky.

Figure 2B:
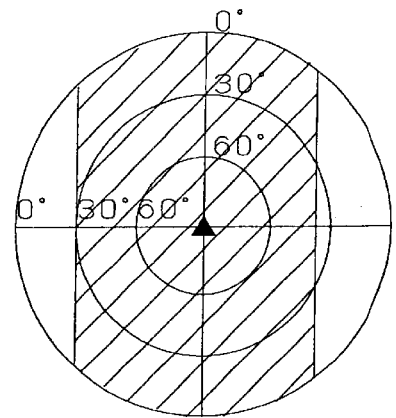

For the vehicle B, there is no obstacle to shield the sky in the advancing direction as shown in FIG. 2B, but in leftward and rightward directions, visual field of the driver is shielded by the first building and by support pillars of the elevated road.

Figure 2C:
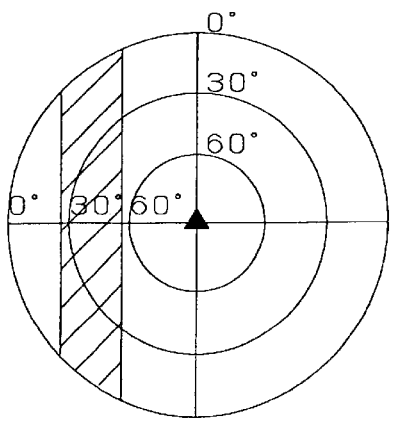
Figure 2D:
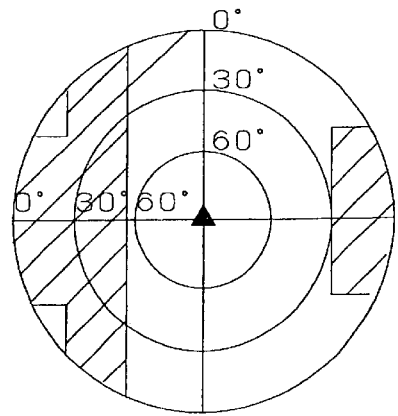

For the vehicle C, the sky can be seen in a part of the advancing direction as shown in FIG. 2C, but visual field of the driver is shielded in leftward and rightward directions by the first building and by support pillars of the elevated road.

As it is evident from FIGS. 2A, 2B and 2C, the area of each of the shaded portions showing the range where the satellite can be seen from the vehicle is narrowed down in the order of vehicle A→vehicle B→vehicle C. In the present specification, the expression "the satellite can be seen" means that electric field intensity of electric wave from the satellite received by the vehicle is equal to or higher than a predetermined value, and it does not mean that the satellite can be seen in optical sense of the words. Also, the expression "the sky can be seen" means that, under the assumption that innumerable satellites are present in the sky, electric field intensity of electric wave received from these satellites by the vehicle is equal to or higher than a predetermined value.

When the vehicle C advances, the sky can be partially seen in leftward and right directions in case the vehicle is at a position where there is no obstacle at left and right, e.g. when the vehicle is going to enter an intersection.

As it is evident from the above explanation, when the position of the vehicle on a multi-layer road is identified, i.e. when it is identified on which layer the vehicle is positioned, prediction can be made to some extent depending upon whether the visible range to see GPS satellites in the sky is wide or narrow. In order to treat the problem quantitatively, a position measuring ratio is defined as follows: Position measuring ratio (%)=(Traveled distance where GPS position measuring is effective)×100/(Traveled distance). By this definition of position measuring ratio, it is possible to identify the position of the vehicle on the road. For example, it is assumed that a vehicle has traveled a distance of 1000 m, and it is also assumed that, of this traveled distance of 1000 m, sum of sections where GPS position measurement can be achieved is 800 m. Then, the position measuring ratio is 80%. If the position measuring ratio is higher than a threshold for identification of the upper, it is judged as the upper layer. If the position measuring ratio is not higher than a threshold for identification of the lower layer, it is judged as the lower layer.

Here, the expression "GPS position measurement can be achieved" means that it is under the condition that at least three satellites can be seen to determine the position of the vehicle by GPS satellites. This is based on the same principle as trigonometrical survey. If the data are not available from more than three satellites, it is regarded as "GPS position measurement cannot be achieved".

Therefore, in the present invention, the ratio of a distance of the sections where GPS position measurement can be achieved in the traveled distance of a given section is more than the threshold for identification of the upper layer, it is judged as the upper layer. If it is lower than the threshold for identification of the lower layer, it is judged as the lower layer. In this case, for the lower layer, the position measuring ratio is exceptionally increased near an intersection, while the position measuring ratio is equally good for the upper layer, and the position of the vehicle on the multi-layer road can be identified. The threshold for identification can be determined as an arbitrary value, and it is not an absolute value.

Figure 3:
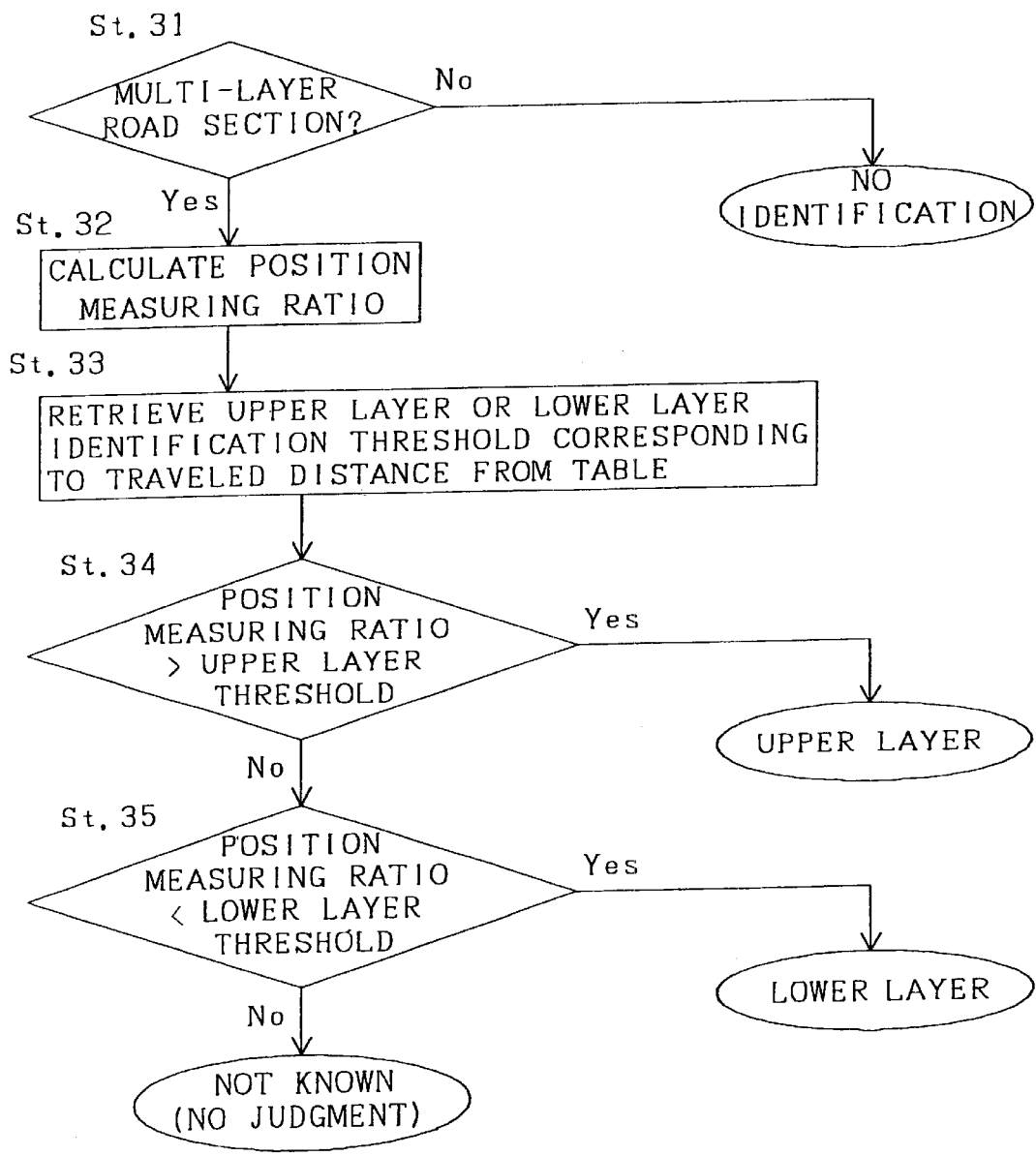
FIG. 3 is a flow chart to explain operation of a first embodiment of the present invention according to a position measuring ratio.

Now, description will be given on operation of embodiments of the present invention referring to the flow charts of FIG. 3 and FIG. 4. FIG. 3 is a flow chart showing operation of a first embodiment of the present invention based on the position measuring ratio. In Step 31 (St 31 in the figure), referring to map data, it is identified whether the present position of the vehicle is on a multi-layer road section or not Specifically, a signal to show whether it is on multi-layer road or not is included in the road map in advance, and it is identified from the relation with the position of the vehicle. If the answer is "No", the procedure is completed without identification procedure. If the answer is "Yes", it is advanced to Step 32, and the position measuring ratio is calculated. Then, in Step 33, the threshold for identification of upper or lower layer corresponding to the traveled distance is retrieved from the table.

In Step 34, it is identified whether the position measuring ratio is higher than the upper layer threshold or not. If the answer is "Yes", it is judged as the upper layer. If the answer is "No", it is advanced to Step 35, and it is judged whether the position measuring ratio is lower than the threshold for the lower layer or not. If the answer is "Yes", it is judged as the lower layer. If the answer is "No", it is judged that it cannot be identified whether it is the upper layer or the lower layer.

Figure 4:
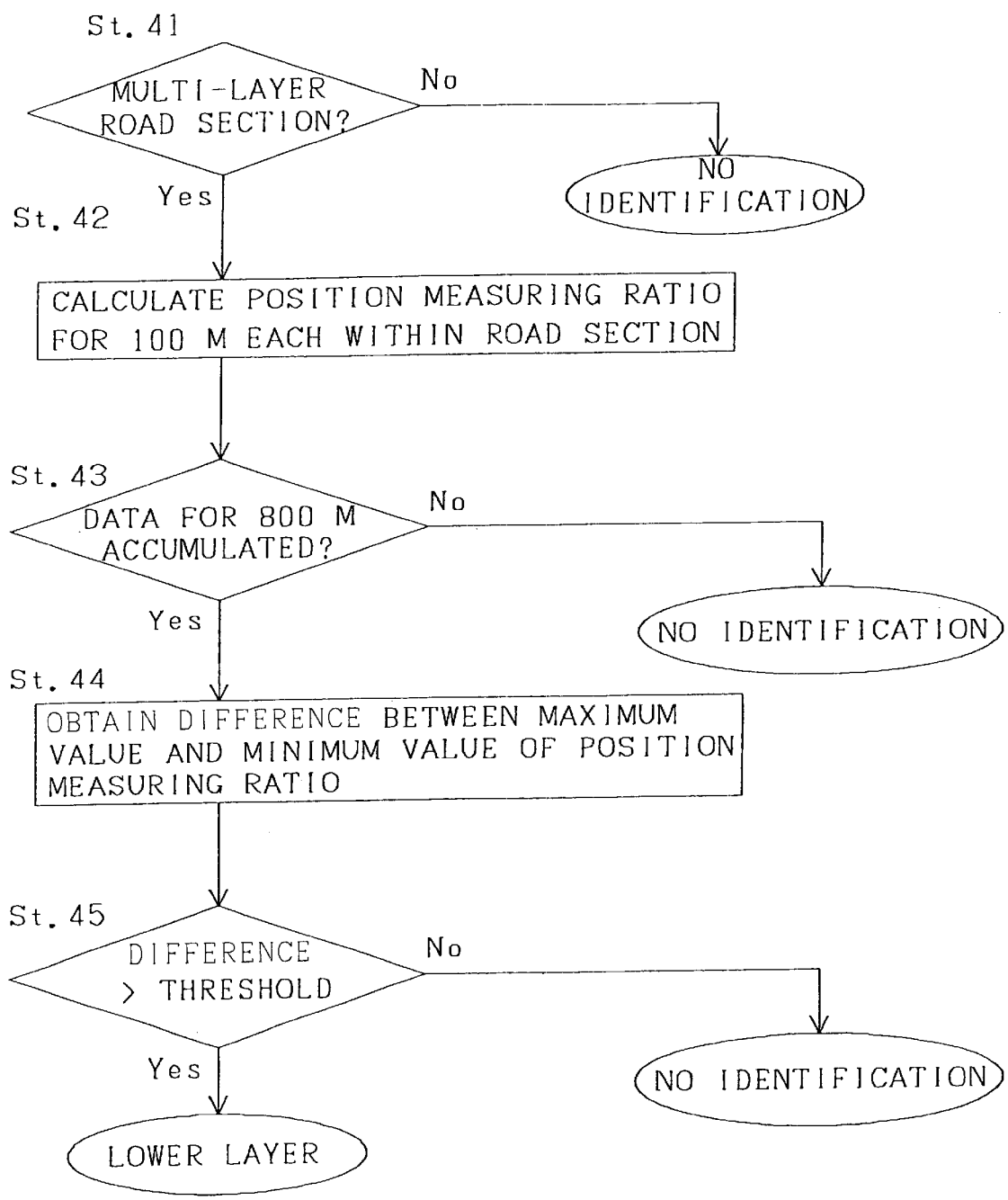
FIG. 4 is a flow chart to explain operation of a second embodiment of the present invention according to a position measuring ratio.

FIG. 4 is a flow chart showing operation of a second embodiment of the present invention based on the position measuring ratio. First, in Step 41, it is judged whether it is a multi-layer road section or not as in FIG. 3 described above. If the answer is "No", the procedure is completed without identifying. If the answer is "Yes", it is advanced to Step 42, and the position measuring ratio is calculated for each section of 100 m. Then, in Step 43, it is judged whether the data has been accumulated for a distance of 800 m. Here, the distance 100 m or 800 m is not an absolute value, and it is an adequate road section determined from the circumstances on the road. If the condition for the Step 43 is not satisfied, i.e. when the answer is "No", the procedure is completed without identifying. If the answer is "Yes", it is advanced to Step 44, and the difference between minimum value and maximum value of the position measuring ratio is obtained. Next, in Step 45, it is judged whether the difference is higher than the threshold or not. If the answer is "No", judgment is not made. If the answer is "Yes", it can be identified as the lower layer. Specifically, in a vehicle running on the lower layer, the position measuring ratio is generally low because the elevated road is present above the vehicle. In an intersection, however, the position measuring ratio increases because visual field of the driver is open in lateral direction. As a result, the difference between maximum value and minimum value of the position measuring ratio is higher than the predetermined value. Based on this principle, it is judged as the lower layer in case the difference between maximum value and minimum value of the position measuring ratio is higher than the predetermined threshold.

As described above, according to the present invention, the range where electric wave from GPS satellite can be received is narrowed down on the sky chart in case of the lower layer road as shown in FIGS. 2A to 2C. As a result, average number of GPS satellites, from which electric wave can be received, is decreased, and the probability not to accomplish position measurement is increased.

Figure 9:
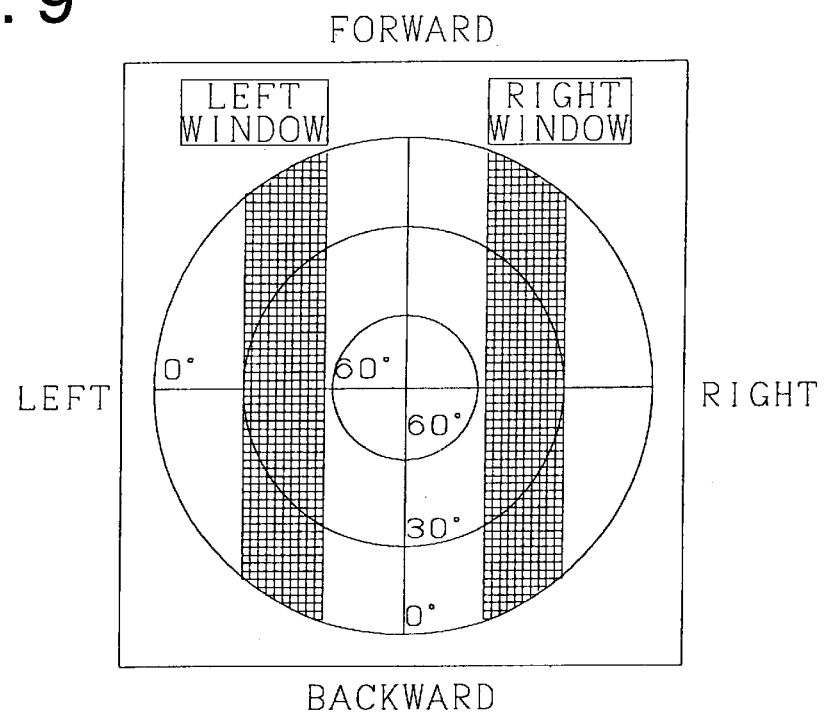
FIG. 9 is a drawing to explain a third embodiment of the present invention to identify the upper layer and the lower layer by utilizing arrangement of visible satellites on a sky chart and not depending on the position measuring ratio.

Also, there is no need to necessarily rely on the position measuring ratio. From the sky charts shown in FIG. 2A and FIG. 2B, when the vehicle is running on the multi-layer road and if satellites can be seen on left and right with respect to the advancing direction, it can be judged as the upper layer. If not, it can be judged as the lower layer. That is, as shown in FIG. 9, a left window and a right window are provided on the sky chart, and if satellites can be seen in both windows, it is judged as the upper layer. If satellites are seen only in one window, it is judged as the lower layer.

Figure 10:
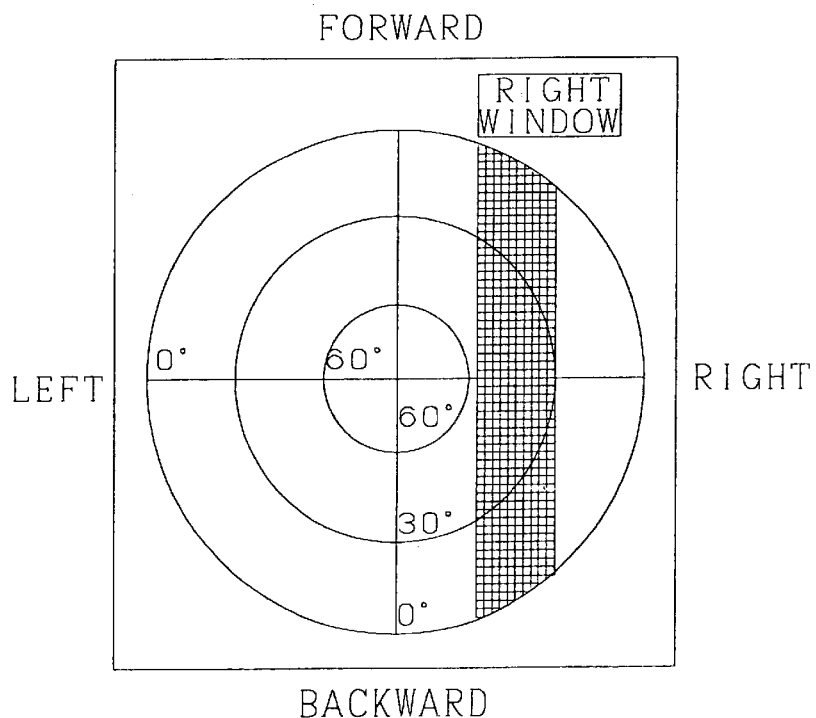
FIG. 10 is a drawing to explain a fourth embodiment of the present invention to identify the upper layer and the lower layer by utilizing arrangement of visible satellites on a sky chart and not depending on the position measuring ratio.

Further, without relying on the position measuring ratio, when the vehicle is driven on the multi-layer road and if satellites can be seen above the lane in opposite direction with respect to the advancing direction of the vehicle as shown in the sky charts shown in FIG. 2A, FIG. 2B or FIG. 2C, it can be identified as the upper layer. If not, it can be identified as the lower layer. That is, in case the vehicle is running on left side on the road, and if satellite is seen on right window as shown in FIG. 10, it is judged as the upper layer. If not, it is judged as the lower layer.

Figure 5:
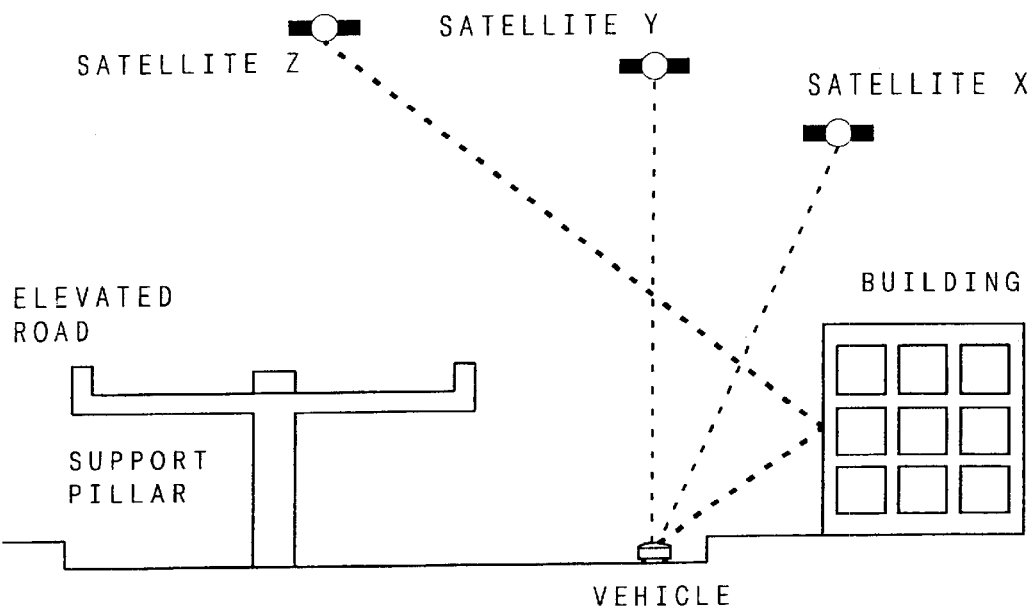
FIG. 5 is a drawing to show how an apparent GPS position measuring condition is arranged by reflection from a building with respect to a vehicle on a multi-layer road in the detection procedure of the present invention.
Figure 6:
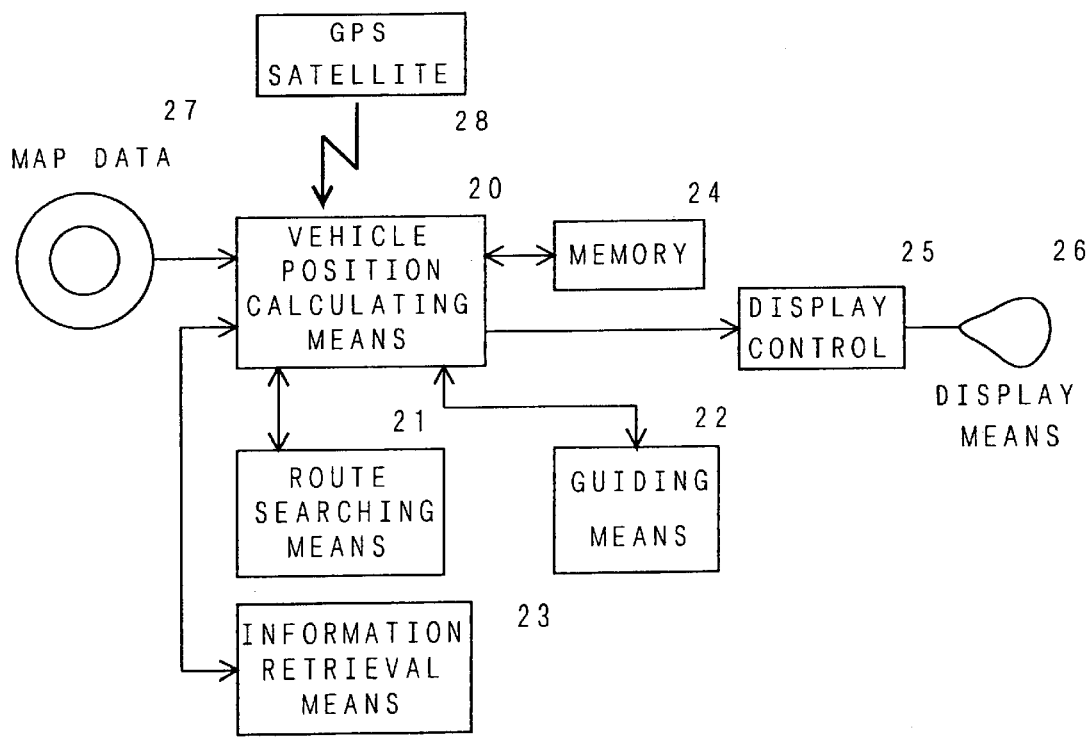
FIG. 6 is a block diagram to explain an arrangement of a conventional type navigation system.
Figure 7:
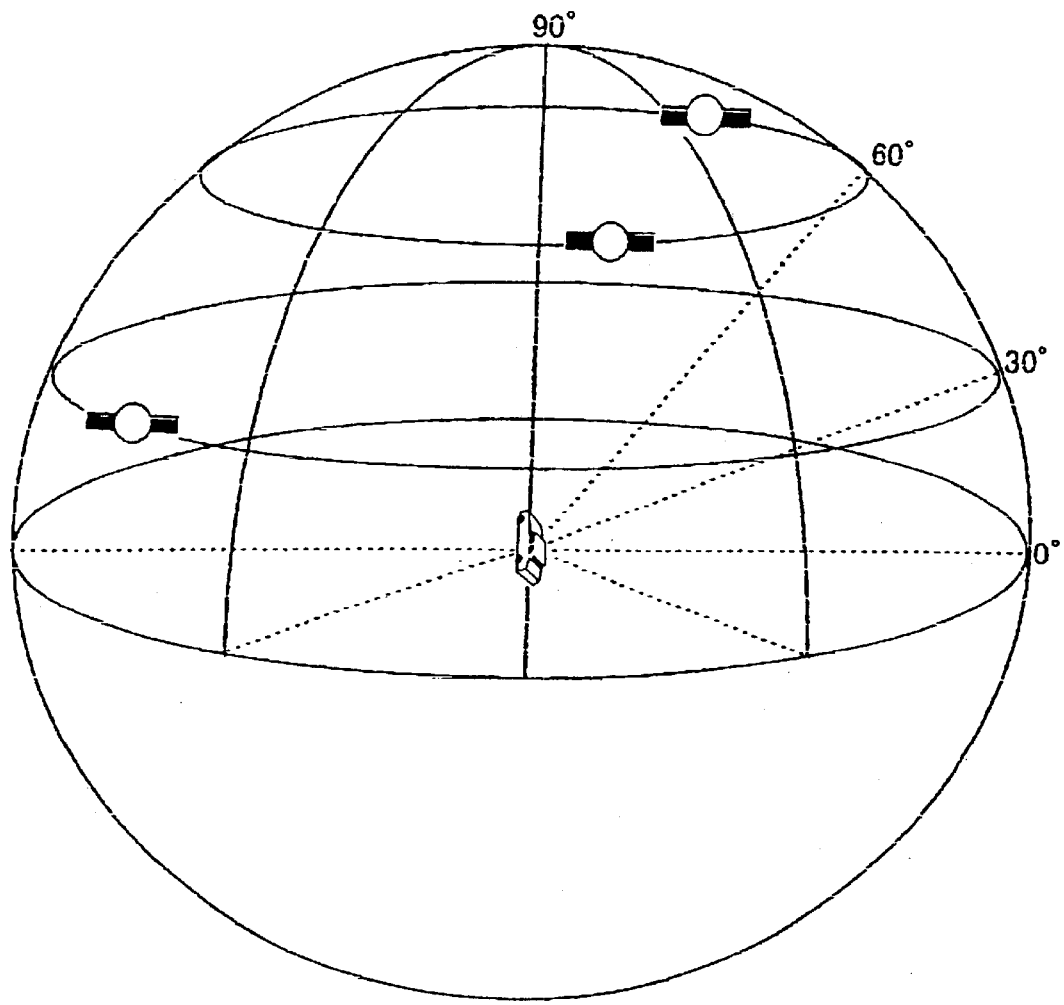
FIG. 7 is a drawing to show an example where general GPS position measurement can be achieved.
Figure 8:
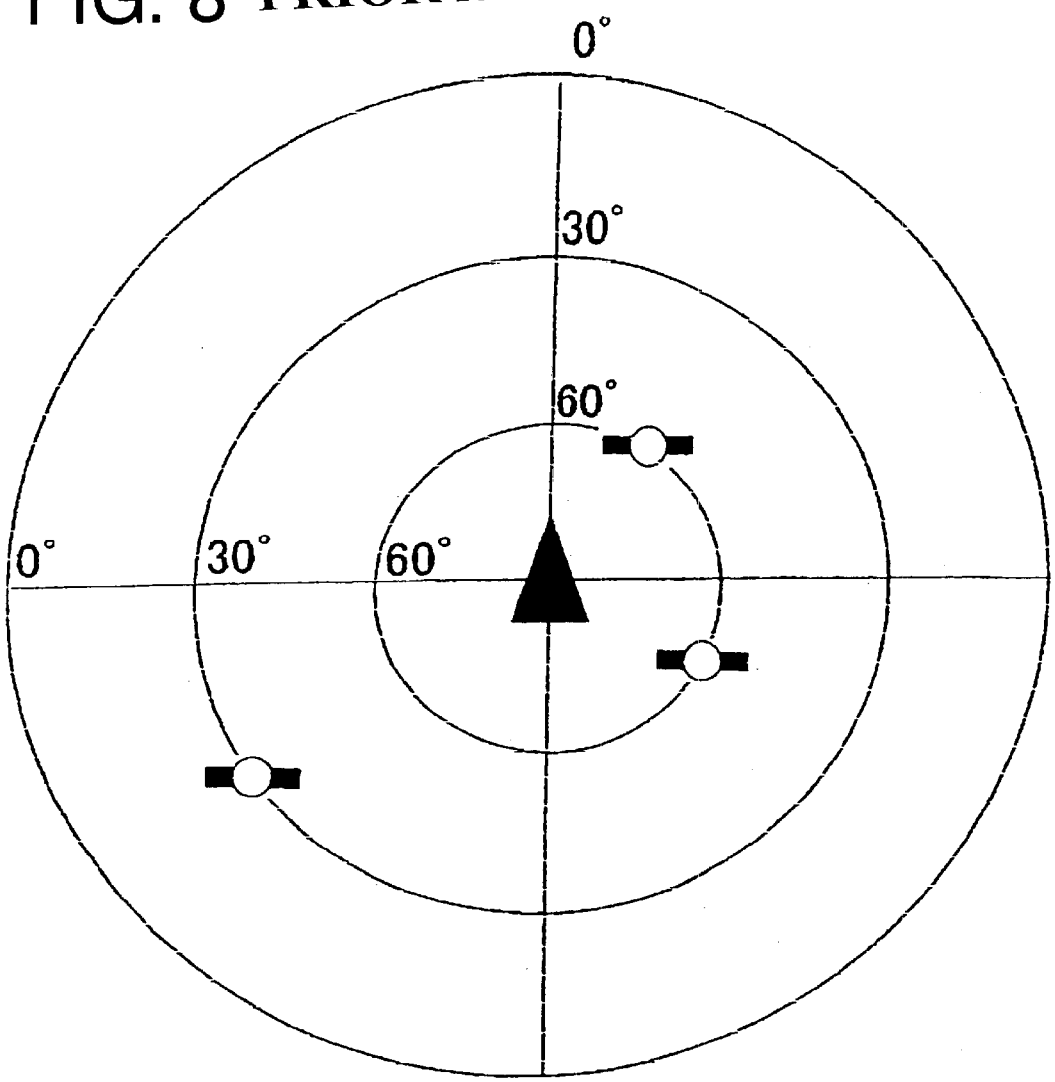
FIG. 8 is a drawing to show an example where general GPS position measurement can be achieved on a sky chart.

Also, as shown in FIG. 5, there may be an apparent (i.e. untrue) condition where three satellites can be seen because of the reflection from an object such as a building. More concretely, a satellite X and a satellite Y can be directly seen as shown in the figure, and there is no problem in position measurement. But, the signal from a satellite Z is reflected by a building. As a result, there is an apparent condition that three GPS satellites can be seen. However, intensity of the signal from the satellite Z reflected by the building is weaker than the intensity of the other satellite X or Y, and this situation can be easily discriminated from each other.

Therefore, from FIGS. 2A, 2B and 2C, when the vehicle is running on a multi-layer road, and if the satellite is not seen above the lane in opposite direction with respect to the advancing direction of the vehicle, it is identified as the upper layer, and if not, it is judged as the lower layer. However, if the level of the receiving signal from the satellite from above the lane in opposite direction is lower than the level of the receiving signal from the satellite in reverse direction to the lane of the opposite direction, it is judged as an apparent (i.e. untrue) upper layer, and erroneous judgment of an apparent upper layer caused by reflection from a building or the like should be avoided.

INDUSTRIAL APPLICABILITY

As described above, according to the method for identifying a position of a vehicle on a multi-layer road according to the present invention, such effects can be provided that an upper layer and a lower layer of the multi-layer road can be identified without using additional new devices or parts on a navigation system.

Specifically, an information necessary for calculation of vehicle position using GPS satellite is a position measuring information, and this information is utilized by almost all types of navigation systems as an information of whether position measurement is effective or ineffective. Because the method according to the present invention utilizes this information, superb effects can be provided without using additional new devices or parts in almost all types of navigation systems.

What is claimed is:

1. A method for identifying a position of a vehicle on a multi-layer road for judging whether a vehicle running on one of the layers of the multi-layer road is running on an uppermost layer or on a lower layer under the uppermost layer of the multi-layer road, whereby, in case a ratio of a distance of a road section where GPS position measuring can be achieved in a predetermined traveling distance is equal to or higher than a predetermined threshold for identification of an upper layer, it is judged that the vehicle is running on the upper layer of the multi-layer road, and in case said ratio is lower than another predetermined threshold for identification of a lower layer, it is judged that the vehicle is running on the lower layer of the multi-layer road.

2. A method for identifying a position of a vehicle on a multi-layer road for judging whether a vehicle running on one of the layers of the multi-layer road is running on an uppermost layer or on a lower layer under the uppermost layer of the multi-layer road, whereby, in case plural sections, in each of which GPS position measurement can be achieved in a predetermined traveling distance are discrete, it is judged that the vehicle is running on the lower layer.

3. A method for identifying a position of a vehicle on a multi-layer road for judging whether a vehicle running on one of the layers of the multi-layer road is running on an uppermost layer or on a lower layer under the uppermost layer of the multi-layer road, whereby, if satellites at left and right are equally seen with respect to an advancing direction of the vehicle, it is judged that the vehicle is running on the upper layer of the multi-layer road, and if the satellites are not seen equally, it is judged that the vehicle is running on the lower layer of the multi-layer road.

4. A method for identifying a position of a vehicle on a multi-layer road for judging whether a vehicle running on one of the layers of the multi-layer road is running on an uppermost layer or on a lower layer under the uppermost layer of the multi-layer road, whereby, if a satellite above a lane in opposite direction with respect to an advancing direction of the vehicle is seen, it is judged that the vehicle is running on the upper layer, and if not, it is judged that the vehicle is running on the lower layer.

5. The method for identifying a position of a vehicle on a multi-layer road according to claim 4, wherein if the level of receiving signal from a satellite above a lane in opposite direction with respect to the advancing direction of the vehicle is lower than the level of receiving signals from a satellite in reverse direction to the lane in opposite direction, it is judged the vehicle is running on an apparent upper layer and not on a true upper layer.

6. A method for identifying a position of a vehicle on a multi-layer road for judging whether a vehicle running on one of the layers of the multi-layer road is running on an uppermost layer or on a lower layer under the uppermost layer of the multi-layer road, comprising the steps of:

performing GPS position measurement a plurality of times each for a predetermined travelling distance of said vehicle;

obtaining maximum and minimum position measuring ratios for the plurality of measurements;

obtaining the difference between said maximum and minimum position measuring ratios;

determining whether said difference exceeds a predetermined value or not; and determining that the vehicle is running on the lower layer when said difference exceeds said predetermined value.

* * * * *